(12) United States Patent
Keast et al.

(10) Patent No.: US 6,340,005 B1
(45) Date of Patent: Jan. 22, 2002

(54) AIR-FUEL CONTROL SYSTEM

(75) Inventors: Leslie Allan Keast, Fort Saskatchewan; Howard Leigh Malm, Coqultiam, both of (CA)

(73) Assignee: REM Technology, Inc., Port Coquitlam (CA)

( * ) Notice: Subject to any disclaimer, the term of this patent is extended or adjusted under 35 U.S.C. 154(b) by 0 days.

(21) Appl. No.: 09/551,748

(22) Filed: Apr. 18, 2000

(51) Int. Cl.[7] ................................................ F02B 3/00
(52) U.S. Cl. .................... 123/27 GE; 123/527; 123/478
(58) Field of Search ........................... 123/352, 27 GE, 123/527, 478, 480; 701/102, 103, 105

(56) References Cited

U.S. PATENT DOCUMENTS

| | | | | |
|---|---|---|---|---|
| 4,597,364 A | * | 7/1986 | Young | 123/27 GE |
| 5,218,945 A | | 6/1993 | Kappellen et al. | 123/687 |
| 5,275,142 A | * | 1/1994 | Kappellen et al. | 123/436 |
| 5,408,957 A | * | 4/1995 | Crowley | 123/27 GE |
| 5,832,896 A | | 11/1998 | Phipps | 123/352 |
| 6,021,755 A | | 2/2000 | Maddock et al. | 123/361 |
| 6,189,523 B1 | * | 2/2001 | Weisbrod et al. | 123/352 |

* cited by examiner

*Primary Examiner*—John Kwon
*Assistant Examiner*—Hieu T. Vo
(74) *Attorney, Agent, or Firm*—Vorys, Sater, Seymour, and Pease LLP

(57) ABSTRACT

A method for controlling the air-fuel ratio in a natural gas engine having an air-fuel mixing device, comprises: determining a speed set-point and an actual engine speed, determining a fuel command based on said speed set-point and said engine speed and controlling the fuel flow to the air-fuel mixing device in response to said fuel command. An air-fuel control system for natural gas engines, comprises: means to determine a speed set-point and an actual engine speed, a governor control unit for generating a fuel command based on said speed set-point and said actual engine speed and a fuel flow regulator coupled to said governor control unit for regulating the flow of fuel to an air-fuel mixing device in response to said fuel command.

10 Claims, 5 Drawing Sheets

AIR-FUEL CONTROL SYSTEM

FIELD OF THE INVENTION

The present invention relates generally to natural gas engines, and more specifically relates to an air-fuel control system for natural gas engines.

BACKGROUND OF THE INVENTION

Natural gas engines are used today as an alternative to liquid fuel engines. The overall performance of the engine in terms of combustion efficiency, speed control, exhaust emission of pollutants and others, greatly depends on controlling the mixing of the air and fuel into an appropriate ratio for combustion and on regulating the flow of this mixture into the combustion part of the engine. Air-fuel control refers herein to both of these control processes.

Many natural gas engines use one or more air-fuel mixing devices such as a carburetor, to prepare a suitable air-fuel mixture for being combusted in the engine. FIG. 1 shows a schematic view of a general natural gas engine with a carburetor using gaseous fuel. Examples of gaseous fuels are methane, ethane, propane, butane, carbon monoxide and hydrogen and mixtures of these gases. The combustion occurs in the engine cylinders. The air-fuel mixture is supplied to the cylinders from the intake manifold. For each cylinder head, an intake valve in the cylinder head opens to admit the air-fuel mixture from the intake manifold into each cylinder. After combustion, an exhaust valve in each cylinder head opens to allow the gaseous combustion products to flow to the exhaust manifold.

The air-fuel mixture flows into the intake manifold from the carburetor of the engine through a throttle or butterfly valve. A governor control unit controls the throttle valve either mechanically or electronically, such that if the engine speed is below the desired speed, the throttle is opened to admit more of the air-fuel mixture from the carburetor and vice-versa.

Air and fuel are supplied to the carburetor for being mixed in a controlled ratio. The flow of fuel into the carburetor is controlled by adjusting fuel valves upstream of the carburetor. The carburetor is designed to control the fuel flow according to the flow of air, such that as the air flow increases more fuel is added.

Air to the carburetor comes either directly from the atmosphere, as naturally aspirated, or from an air pressure increasing device, such as a blower, supercharger, turbocharger or fan, which increases the pressure and density of the air. Usually, a turbocharger is powered by the hot exhaust gases, while a supercharger is driven mechanically by the engine or a separate motor, such as an electric motor. Not shown, but often present, is an air cooler between the air pressure increasing device and the carburetor or air-fuel mixing device. The fuel gas comes from a fuel source and flows through a pressure regulator that ensures the pressure of the gas provided to the carburetor is controlled. In some cases the regulator is referenced to the air pressure of the air provided to the carburetor.

The combustion gases may either be vented to the atmosphere or be ducted to a turbocharger, which derives energy from the hot exhaust gases to compress the air used by the engine.

For multi-cylinder engines and V engines there may be more than one carburetor and one turbocharger or supercharger. The control method is similar to that described.

Many special modifications have been made to the carburetor design to achieve the desired air to fuel control over the starting and running conditions for a wide load range. In practice, it has proven very difficult to achieve the desired result over all conditions. Normally, a best compromise has been used according to the particular demands of the operating requirements for the engine. In addition, engine starting is sometimes difficult due to the inability to achieve the desired air-fuel control for starting and idle conditions.

SUMMARY OF THE INVENTION

It is an object of the invention to provide a novel air-fuel control system for natural gas engines.

According to one aspect of the invention, there is provided a method for controlling the air-fuel ratio in a natural gas engine having an air-fuel mixing device, the method comprising: determining a speed set-point and an actual engine speed; determining a fuel command based on said speed set-point and said engine speed; and controlling the fuel flow to the air-fuel mixing device in response to said fuel command.

According to another aspect of the invention, there is provided an air-fuel control system for natural gas engines, the air-fuel control system comprising: means to determine a speed set-point and an actual engine speed; a governor control unit for generating a fuel command based on said speed set-point and said actual engine speed; a fuel flow regulator coupled to said governor control unit for regulating the flow of fuel to an air-fuel mixing device in response to said fuel command.

The invention described can be applied to any engine currently equipped with one or more air-fuel mixing devices such as a carburetor.

Among the advantages presented by the air-fuel control system of the preferred embodiment of the invention are: good speed control, stable operation, ability to follow load changes and low emissions of CO and $NO_x$. Other advantages, objects, and features of the present invention will be readily apparent to those skilled in the art from a review of the following detailed description of preferred embodiments in conjunction with the accompanying drawings and claims.

BRIEF DESCRIPTION OF THE DRAWINGS

The present invention will now be explained, by way of example only, with reference to certain embodiments and the attached Figures in which.

Similar references are used in different drawings to denote similar components.

DETAILED DESCRIPTION OF THE INVENTION

Figure 1:
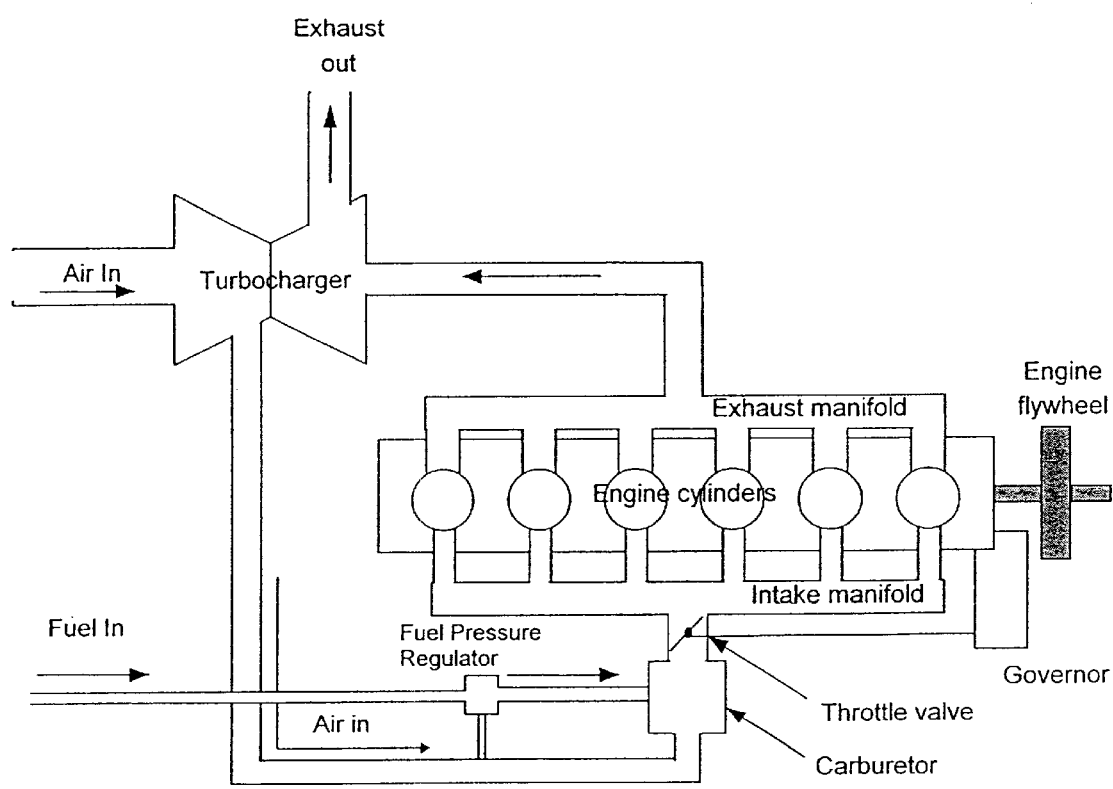
FIG. 1 is a schematic view of a general prior art natural gas engine.
Figure 2:
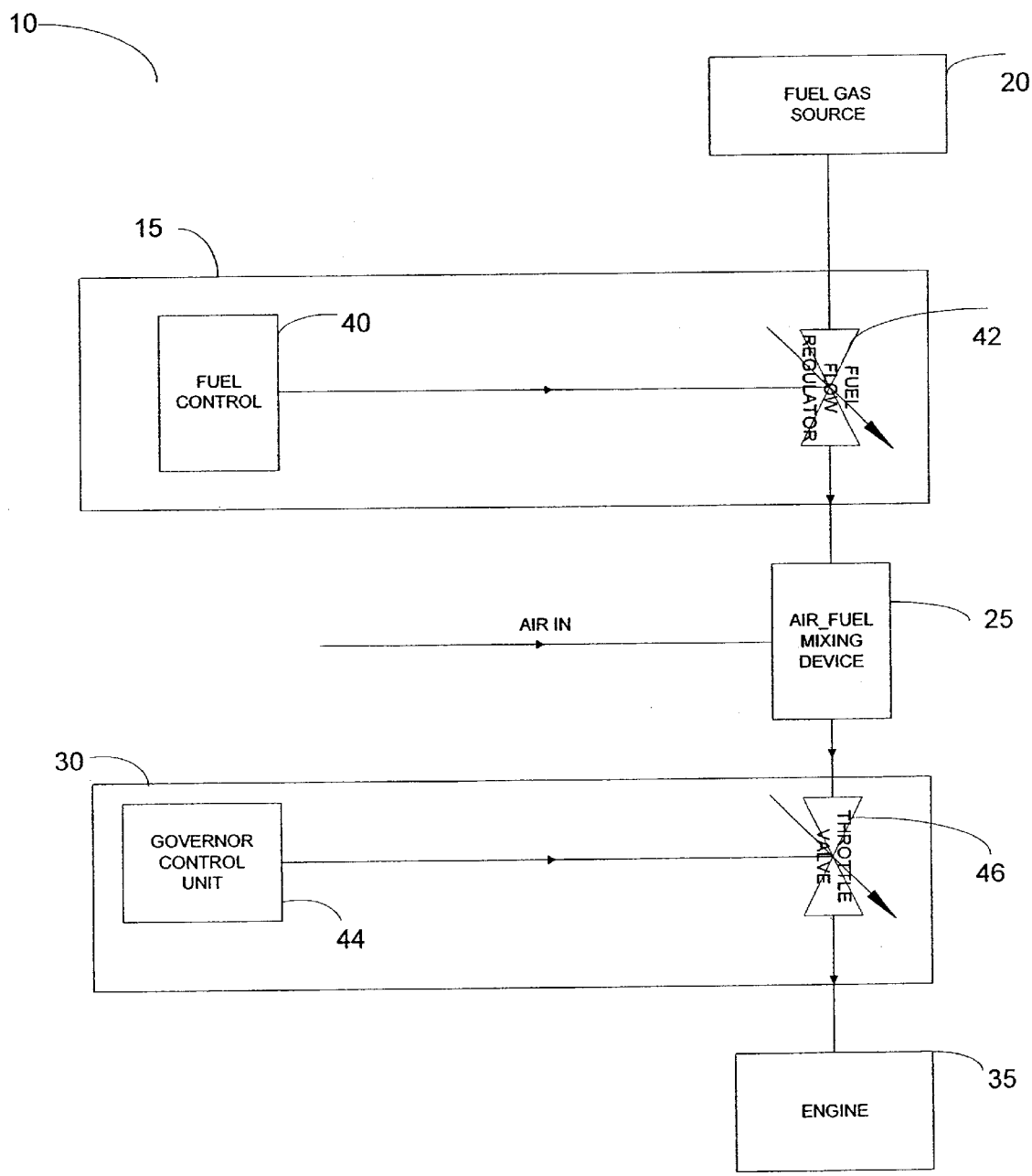
FIG. 2 is a block diagram of a known air-fuel control system for a natural gas engine.

First, a known air-fuel control system 10 for use in a natural gas engine is described in reference with FIG. 2. The air-fuel control system 10 comprises fuel flow controlling means 15 for achieving control of the fuel flow from a fuel gas source 20 into an air-fuel mixing device 25. The air-fuel control system 10 also comprises air-fuel flow controlling means 30 for achieving control of the flow of the air-fuel mixture from the air-fuel mixing device 25 into the intake region of the engine 35. The fuel flow controlling means 15 comprises a fuel control device 40 that actuates a fuel flow regulator 42, set in the flowing path of the fuel, from the fuel source 20 to the air-fuel mixing device 25. The fuel control unit 40 may be a combination of hardware, software and mechanical parts operating together to produce a control command signal for adjusting the fuel flow regulator 42, based on various process parameters. The air-fuel mixture flow controlling means 30 comprises a governor control unit 44 that generates commands for actuating a throttle or butterfly valve 46, set in the flowing path of the air-fuel mixture from the air-fuel mixing device 25 to the intake part of the engine 35. The governor control unit 44 may be a combination of hardware, software and mechanical parts operating together to produce a control command signal for the throttle valve 46, based on various process parameters including the actual engine speed and a desired engine speed or speed set-point. A carburetor is often used as the combination of the air-fuel mixing device 25 and a full metering device. The fuel metering device may be separate from or may be part of the fuel flow controlling means 15. The amount of fuel added to the air is controlled by the amount of air flowing through the carburetor. In cases where an air pressure increasing device is present an additional fuel pressure regulator controls the pressure of the fuel supplied to the carburetor.

Figure 3:
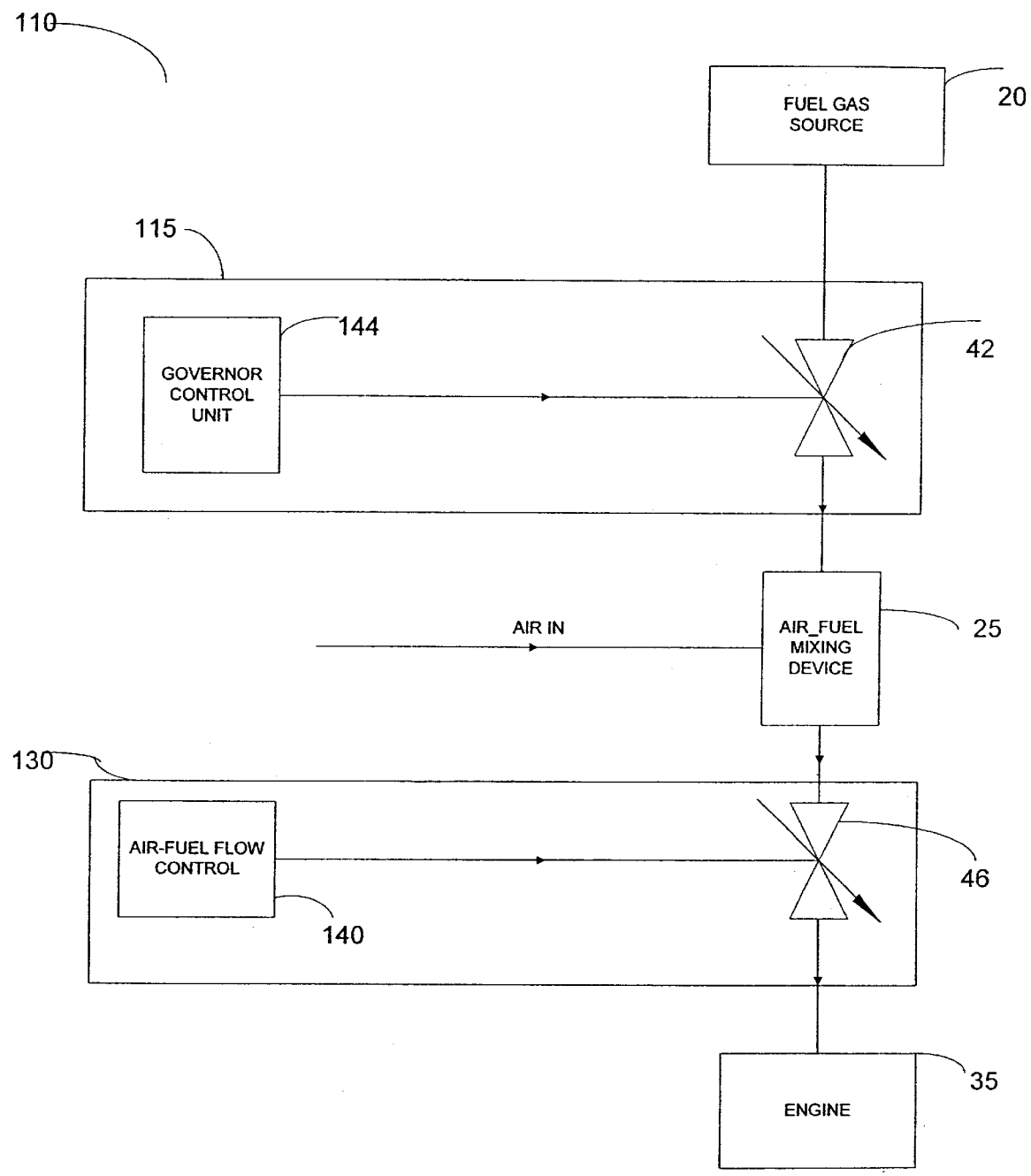
FIG. 3 is a block diagram of an air-fuel control system in accordance with an embodiment of the invention.

Referring now to FIG. 3, an air-control system 110 for use in a natural gas engine, in accordance with an embodiment of the present invention is described. The air-fuel control system 110 comprises fuel flow controlling means 115 for achieving control of the fuel flow from the fuel gas source 20 into the air-fuel mixing device 25. The air-fuel control system 110 also comprises air-fuel flow controlling means 130 for achieving control of the flow of the air-fuel mixture from the air-fuel mixing device 125 into the intake region of the engine 35. The fuel flow controlling means 115 comprises a governor control unit 144 that generates commands for actuating the fuel flow regulator 42. The governor control unit 144 produces a control command signal for adjusting the fuel flow regulator 42, based on various process parameters including the actual engine speed and a desired engine speed or speed set-point. The air-fuel flow controlling means 130 comprises an air-fuel flow control unit 140 that generates commands for the throttle or butterfly valve 46. The air-fuel flow control unit 140 produces a control command signal for actuating the throttle valve 46, based on various process parameters. By comparison with the air-fuel control system 10 in FIG. 2, in the air-fuel control system in FIG. 3, the governor control unit 144 sends commands to the fuel flow regulator 42, rather than to the throttle valve 46. In other words, in the embodiment of the invention presented in FIG. 3, the actual engine speed and the speed set-point, which are input parameters for the governor control unit, are used primarily to control the flow of fuel from the fuel source to the air-mixing chamber, rather than to control the flow of the air-fuel mixture from the air-fuel mixing device 25 to the intake part of the engine 35, as in FIG. 2.

Figure 4:
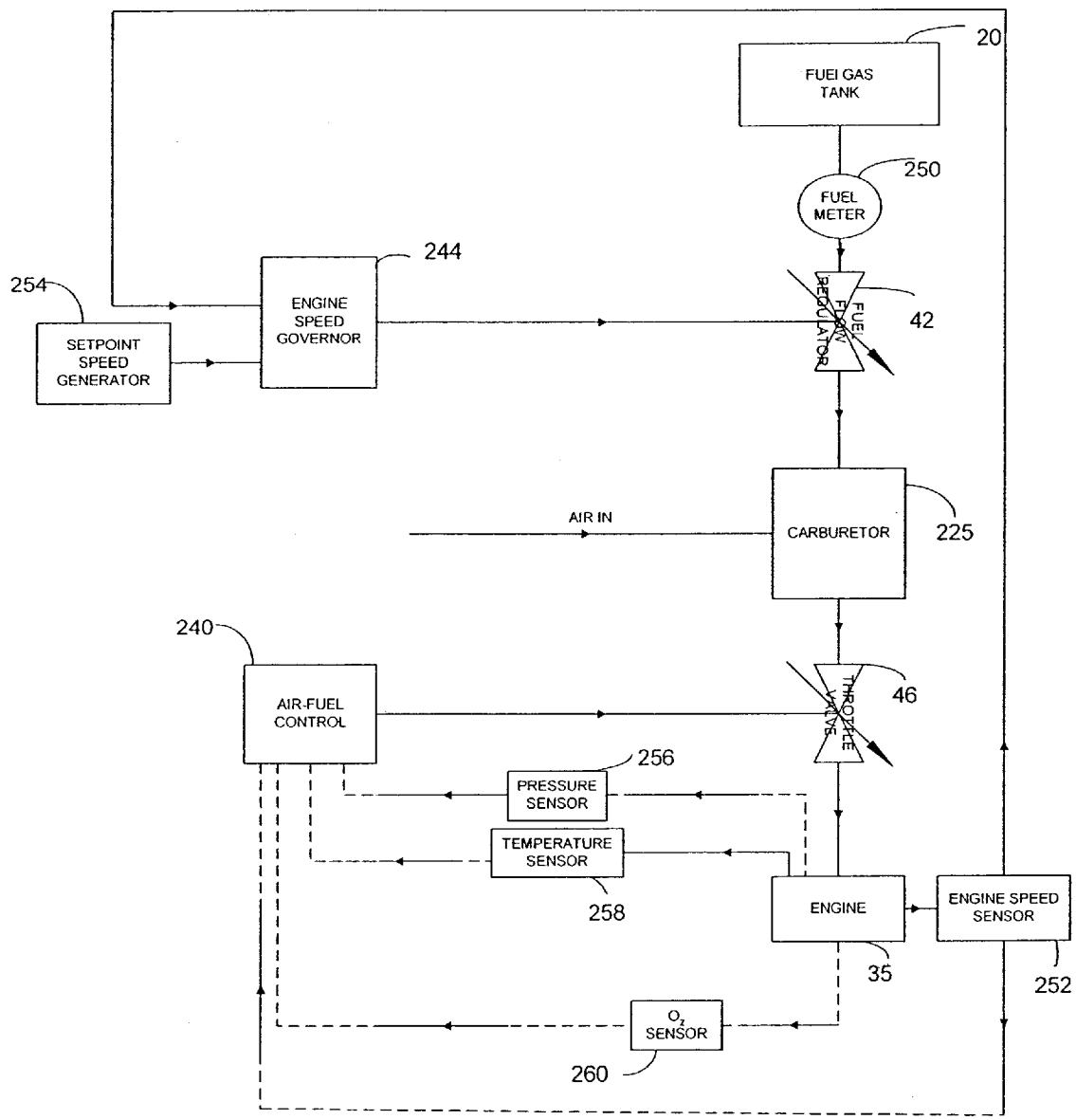
FIG. 4 is a block diagram of an air-fuel system in accordance with a preferred embodiment of the invention.

Referring now to FIG. 4, an air-fuel control system 210 according to a preferred embodiment of the present invention is described. The air-fuel control system 210 is used with a natural gas engine, such as a Waukesha natural gas type engine. Fuel gas is metered from a fuel gas source 20 through a fuel meter 250 and allowed to flow into at least one carburetor 225 through a fuel flow regulator 42, such as a fuel valve. The air-fuel mixture passes through the throttle valve 46 into the intake manifold (not shown) of the engine. The intake manifold delivers the fuel to one or more cylinders (not shown). The exhaust from the cylinders passes out of the engine through the exhaust manifold and goes to a turbocharger (not shown).

A governor control unit 244 receives signals from an engine speed sensor 252 and a speed set-point generator 254 and sends control signals to an actuator of the fuel flow regulator 42. The engine speed sensor 252 can be any type of sensor that accurately produces an electrical signal indicative of the engine crankshaft speed. Such sensors are well-known in the art. The speed set-point generator 254 receives an indication of the desired engine speed that can either be entered by a user through an electronic interface, through a throttle pedal, or can be indicated by a more complex system such as a cruise control system. Therefore, in the preferred embodiments, the governor 244 is used to control the fuel pressure regulator 42 such that a higher fuel pressure is delivered to the carburetor 225 if the engine speed is too low, and vice-versa. The increased fuel pressure causes more fuel to be added to the air passing through the carburetor 225 which results in additional fuel being delivered to the engine speed cylinders, therefore in an increase in engine speed. Experimentally it was determined that by using the actual engine speed and speed set-point as direct control parameters for the fuel flowing into the air-mixing chamber, the engine speed response follows the speed set-point in a more stable manner. While the mixture temporarily becomes richer, the air-fuel control 240 acts to adjust the throttle valve 46 appropriately to increase the amount of air-fuel mixture flowing to the intake manifold. This also results in an increase in engine speed, which is compensated by a reduction in the fuel pressure supplied to the carburetor 225. The air-fuel control 240 is described in the following text.

The air-fuel control unit 240 receives input signals from one or more of the following: the engine speed sensor 252, a pressure sensor 256, a temperature sensor 258 and an $O_2$ sensor 260, and sends control signals to an actuator of the throttle or butterfly valve 46. The connections of these sensors to the air-fuel control unit 240 are shown by dashed lines in FIG. 4, as only some but not all of the corresponding signals may be used as input signals for the air-fuel control unit, in calculating a control command for the actuator of the throttle valve 46, according to specific further embodiments, as discussed in more detail below.

The pressure sensor 254 and the temperature sensor 256 are located in the intake manifold of the engine and produce pressure and temperature signals, indicative of the pressure and temperature in the intake manifold, respectively.

The $O_2$ sensor 260 is located in the exhaust manifold of the engine and produces a signal indicative of the amount $O_2$ in the exhaust manifold. It will be appreciated that a sensor for unused fuel or a sensor for any other products in the combustion reaction, may be used in the exhaust part instead of the $O_2$ sensor 260, to indicate the extent to which fuel was burned in the cylinders.

It will also be appreciated by a person skilled in the art that the flow of fuel upstream of the carburetor may be controlled by other fuel valves, in addition to the fuel flow regulator 42. Actuators controlling such fuel valves may be controlled by command signals determined based on various combinations of process variables. Furthermore, the carburetor 225 itself has a fuel control element disposed at its intake fuel part.

In the preferred embodiments of FIG. 4, the governor control unit 244 and the air-fuel flow control unit 240 function based on any of hydraulic, pneumatic, electronic or software means, and may use a control algorithm such as PID (proportional, integral, derivative), for processing the input signals into control output signals. PID control algorithms are well-known in the art.

Figure 5:
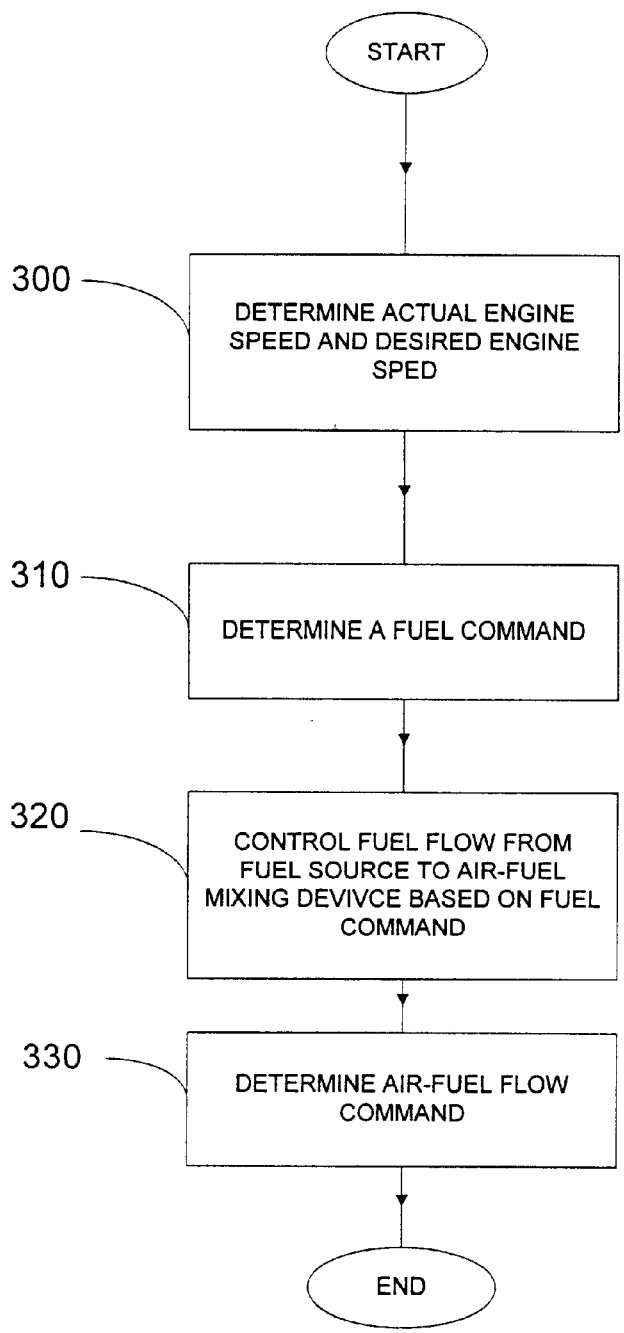
FIG. 5 is a flow-chart of a method of providing air-fuel control in accordance with the system in FIG. 3.

FIG. 5 illustrates the preferred embodiments of the method of the present invention. In the first step 300, a speed set-point or desired engine speed and an actual engine speed are determined. Next, at step 310, a fuel command is determined based on the speed set-point and the actual engine speed. At step 320, the flow of fuel to the air-fuel mixing chamber is adjusted according to the fuel command. Finally, an air-fuel flow control command is determined and the air-fuel flow from the air-fuel mixing chamber to the combustion part of the engine is adjusted accordingly (step 330). This sequence of operations is repeated so long as the engine is running.

In a first preferred method, the air-fuel flow command is calculated based on the intake manifold pressure as process variable and a set point is calculated from the fuel flow, the actual engine speed and the intake manifold temperature. An illustrative set-point calculation for this method is given by:

$$\text{Air-pressure set-point} = m*(\text{fuelflow/RPM}) - \text{Ref\_pres}$$

and parameter m is calculated as:

$$m = \{(a\lambda + b)*(\text{air-fuel-temp} + c)/d\}$$

where, a, b, c, d are constants for scaling the equation in appropriate units;

Fuelflow is the volumetric or mass flow rate

RPM is the engine RPM,

Ref_pres is the site atmospheric pressure

Air-fuel-temp is the temperature of the air-fuel mixture in the intake manifold $\lambda$ is the desired excess air amount or the lean-burn parameter.

Referring back to FIG. 4, the Fuelflow is measured by the fuel meter 250, which can measure either volumetric or mass fuel flow. The mass fuel flow option can be used to compensate for fuels with changing densities and thereby prevent outages or cylinder damage. The Fuelflow may be averaged periodically, such as every 15 to 30 seconds. The averaging time period is selectable.

For the case of V-engines, the process variable is an average pressure accounting for right and left intake manifold pressures.

When N cylinders are used, the above equation is scaled appropriately to take into account this modification. In particular, the slope of the modified equation may be $m_N = *k/N$, where k is a constant dependent on the arrangement of cylinders in the engine. Other equations or a table (map) may also be used to calculate the throttle valve setting.

An alternative to the above described method for the air-fuel flow command calculation is to use the exhaust $O_2$ amount as indicated by the exhaust $O_2$ sensor 260 in FIG. 4, as process variable and the desired exhaust $O_2$ or unused fuel as set-point. For example, the user sets the desired exhaust $O_2$ percentage and the air fuel controller 240 adjusts the throttle valve to achieve that value 46 i.e. if the measured $O_2$ is below the set-point, the throttle valve 46 is opened and vice-versa. A preferred method is where the two methods are used in combination, such that the throttle valve 46 is set according to the calculation or map and the $O_2$ sensor is used 260 for trim.

In the preferred embodiments, air manifold temperature compensation is built in to the control strategy to ensure that the air-fuel ratio is not affected by changes in the air temperature. Furthermore, in the preferred embodiments, the air-fuel control system is operated by an integrated monitoring and control system commercialized under the name of REMVue and described in the U.S. patent application Ser. No. 09/497,767 which is hereby incorporated by reference.

Numerous modifications, variations and adaptations may be made to the particular embodiments of the invention described in the documents attached herein, without departing from the scope of the invention, which is defined in the claims.

The embodiments of the invention in which an exclusive property of privilege is claimed are defined as follows:

1. An air-fuel control system for a natural gas engine provided with an air-fuel mixing device, comprising:

means for establishing a speed set point;

means for determining an actual engine speed;

a governor control unit for generating a fuel command based on said speed set-point and said actual engine speed;

a fuel flow regulator coupled to said governor control unit for regulating the flow of fuel to the air-fuel mixing device in response to said fuel command to produce an air-fuel mixture; and air-fuel flow control means for regulating the flow of said air-fuel mixture from said air-fuel mixing device to an intake manifold of said engine.

2. The system in claim 1, wherein said air-fuel flow control means comprises:

a pressure sensor for measuring the pressure value in said engine;

a temperature sensor for measuring the temperature value of said engine;

air-fuel control for receiving said pressure and temperature values and controlling said throttle accordingly.

3. The system in claim 2, further comprising oxygen sensor.

4. A method for controlling the air-fuel ratio in a natural gas engine having an air-fuel mixing device, comprising:

generating a fuel command based on a speed set point and an actual engine speed;

controlling the fuel flow to said air-fuel mixing device in response to said fuel command; and controlling the air-fuel flow through a throttle valve for regulating the air-fuel flow from the air-fuel mixing device into an intake manifold of the engine.

5. The method in claim 4, wherein the air-fuel mixing device is a carburetor.

6. The method in claim 4, wherein the step of controlling the fuel flow further comprises controlling a fuel pressure regulator located upstream of the air-fuel mixing device.

7. The method in claim 4, further comprising:

calculating an air-fuel set-point;

determining an air-fuel command based on said air-fuel set-point; and controlling the flow of an air-fuel mixture from the air-fuel mixing device into an intake manifold of the natural gas engine.

8. The method in claim 7, wherein the air-fuel set-point calculation step further comprises calculating the air-fuel set-point based on the actual engine speed.

9. The method of claim 7, wherein the air-fuel set-point calculation further comprises determining the pressure and temperature in the intake manifold; calculating the air-fuel set-point based on the actual engine speed, the inlet pressure and temperature.

10. The method in claim 7 wherein the calculated air-fuel set-point is derived from a parameter related to at least one of the amount of oxygen and the unused fuel in the combustion products in an exhaust manifold, and a parameter related to the engine speed.

* * * * *